United States Patent
Muramatsu et al.

(10) Patent No.: US 11,760,371 B2
(45) Date of Patent: Sep. 19, 2023

(54) VEHICLE COMMUNICATION DEVICE AND NON-TRANSITORY COMPUTER-READABLE RECORDING MEDIUM STORING PROGRAM

(71) Applicants: HONDA MOTOR CO., LTD., Tokyo (JP); DWANGO Co., Ltd., Tokyo (JP)

(72) Inventors: Daisuke Muramatsu, Tokyo (JP); Koji Hashimoto, Tokyo (JP); Takafumi Inano, Tokyo (JP); Takuto Miyazaki, Tokyo (JP); Naomichi Kashima, Tokyo (JP); Tatsuro Shiomi, Tokyo (JP); Naoshi Gyoda, Tokyo (JP)

(73) Assignees: Honda Motor Co., Ltd, Tokyo (JP); Dwango Co., Ltd, Tokyo (JP)

( * ) Notice: Subject to any disclaimer, the term of this patent is extended or adjusted under 35 U.S.C. 154(b) by 163 days.

(21) Appl. No.: 17/439,649

(22) PCT Filed: Dec. 25, 2019

(86) PCT No.: PCT/JP2019/050754
§ 371 (c)(1),
(2) Date: Sep. 15, 2021

(87) PCT Pub. No.: WO2020/188942
PCT Pub. Date: Sep. 24, 2020

(65) Prior Publication Data
US 2022/0153290 A1  May 19, 2022

(30) Foreign Application Priority Data

Mar. 15, 2019 (JP) ................................. 2019-048736

(51) Int. Cl.
*B60W 50/14* (2020.01)
*B60W 40/105* (2012.01)
(Continued)

(52) U.S. Cl.
CPC ............. *B60W 50/14* (2013.01); *B60K 35/00* (2013.01); *B60Q 1/343* (2013.01);
(Continued)

(58) Field of Classification Search
CPC ............... B60W 50/14; B60W 40/105; B60W 2050/143; B60W 2050/146;
(Continued)

(56) References Cited

U.S. PATENT DOCUMENTS 4,314,232 A * 2/1982 Tsunoda .............. B60R 16/0373
340/901
5,406,492 A * 4/1995 Suzuki ............... G01C 21/3655
701/428
(Continued)

FOREIGN PATENT DOCUMENTS

JP 2004361766 A * 12/2004
JP 2005153662 A * 6/2005
(Continued)

OTHER PUBLICATIONS

PCT/ISA/210 from International Application Publication PCT/JP2019/050754 including the English translation.
(Continued)

*Primary Examiner* — Chico A Foxx
(74) *Attorney, Agent, or Firm* — Carrier, Shende & Associates P.C.; Joseph P. Carrier; Jeffrey T. Gedeon

(57) ABSTRACT

When a vehicle information acquisition unit continuously acquires an On signal of a blinker switch, when the absolute value of a steering angle of a handle is 90° or greater, and a vehicle speed is a threshold or greater, a dialogue confirmation unit of this vehicle communication device selects a dialogue that corresponds to the On signal, the steering angle, and the vehicle speed from dialogues of group A stored in a dialogue storage unit. Thereafter, when the
(Continued)

steering angle or the vehicle speed changes, the dialogue confirmation unit selects the dialogue that corresponds to changes in the steering angle or the vehicle speed from among dialogues of group.

10 Claims, 14 Drawing Sheets

(51) Int. Cl.
*B60Q 1/34* (2006.01)
*B60K 35/00* (2006.01)

(52) U.S. Cl.
CPC ... *B60W 40/105* (2013.01); *B60K 2370/1575* (2019.05); *B60K 2370/566* (2019.05); *B60W 2050/143* (2013.01); *B60W 2050/146* (2013.01); *B60W 2540/18* (2013.01)

(58) Field of Classification Search
CPC .............. B60W 2540/18; B60K 35/00; B60K 2370/1575; B60K 2370/566; B60Q 1/343
See application file for complete search history.

(56) References Cited

U.S. PATENT DOCUMENTS

| | | | | |
|---|---|---|---|---|
| 5,893,894 | A * | 4/1999 | Moroto | F16H 59/66 |
| | | | | 701/55 |
| 7,693,627 | B2 * | 4/2010 | Natsume | G01M 17/02 |
| | | | | 701/1 |
| 9,487,139 | B1 * | 11/2016 | Ishida | B60W 50/16 |
| 2006/0187016 | A1 * | 8/2006 | Tsukida | B60Q 1/40 |
| | | | | 340/476 |
| 2006/0235753 | A1 | 10/2006 | Kameyama | |
| 2007/0192038 | A1 * | 8/2007 | Kameyama | G06F 16/436 |
| | | | | 707/E17.143 |
| 2008/0119994 | A1 * | 5/2008 | Kameyama | B60W 40/08 |
| | | | | 701/1 |
| 2009/0030619 | A1 * | 1/2009 | Kameyama | G06F 16/68 |
| | | | | 702/19 |
| 2017/0116853 | A1 * | 4/2017 | Hu | B60R 1/00 |
| 2017/0197551 | A1 * | 7/2017 | Lee | B60W 30/0953 |
| 2017/0267251 | A1 * | 9/2017 | Roberts | A61B 5/18 |
| 2018/0053413 | A1 * | 2/2018 | Patil | G01S 11/14 |
| 2018/0093709 | A1 * | 4/2018 | Oguro | B60W 30/12 |
| 2018/0170229 | A1 * | 6/2018 | Hashimoto | B60W 50/14 |
| 2018/0204572 | A1 * | 7/2018 | Manabe | G10L 13/00 |
| 2019/0221118 | A1 * | 7/2019 | Kume | G08G 1/167 |
| 2019/0263401 | A1 * | 8/2019 | Yoo | G08G 1/167 |
| 2019/0337533 | A1 * | 11/2019 | Kume | B60W 50/14 |
| 2020/0001875 | A1 * | 1/2020 | Kato | G01C 21/3602 |
| 2020/0225343 | A1 * | 7/2020 | Lee | G01S 7/003 |
| 2020/0239027 | A1 * | 7/2020 | Watanabe | G05D 1/0088 |
| 2020/0307596 | A1 * | 10/2020 | Yashiro | B60W 40/04 |
| 2020/0407001 | A1 * | 12/2020 | Tetsuka | B62J 50/22 |

FOREIGN PATENT DOCUMENTS

| | | | |
|---|---|---|---|
| JP | 3675235 | B2 * | 7/2005 |
| JP | 2006-091003 | A | 4/2006 |
| JP | 2006-160032 | A | 6/2006 |
| JP | 3873386 | B2 | 1/2007 |
| JP | 2007133732 | A * | 5/2007 |
| JP | 2007-145226 | A | 6/2007 |
| JP | 2013-078969 | A | 5/2013 |
| JP | 2019-016153 | A | 1/2019 |
| WO | WO-2007122864 | A1 * | 11/2007 |

OTHER PUBLICATIONS

Office Action and Search Report dated Sep. 2, 2022 issued over the corresponding Chinese Patent Application No. 201980094194.7 with a partial English translation thereof.

Office Action dated Mar. 25, 2023 issued in the corresponding Chinese Patent Application 201980094194.7 with the English machine translation thereof.

* cited by examiner

FIG. 2

| GROUP | OCCURRENCE RATE Rga (%) | LINES OF DIALOG |
|---|---|---|
| A-GROUP (DIALOG CONFIRMING MANIPULATION FOR RIGHT TURN OR LANE CHANGE TO RIGHT) | 1.5 | TURNING RIGHT |
| | 1.5 | LET'S TURN RIGHT |
| | 1.5 | TURN RIGHT HERE! |
| | 1 | TURNING RIGHT! WATCH OUT FOR ONCOMING TRAFFIC AND PEDESTRIANS |
| | 1 | "USETSU"! IN ENGLISH, THAT'S RIGHT TURN |
| | 1 | CHECK YOUR SURROUNDINGS |
| | 1 | NICE RIGHT TURN! |
| | 1 | RIGHT TURN IS MORE DIFFICULT THAN LEFT TURN, SO BE CAREFUL! |
| | 0.5 | LET'S GO RIGHT! |

| GROUP | OCCURRENCE RATE Rgb (%) | LINES OF DIALOG |
|---|---|---|
| B GROUP (DIALOG DRAWING ATTENTION TO CHANGE) | 1.5 | WHAT WAS THAT? |
| | 1.5 | HUH? WHAT HAPPENED? |
| | 1.5 | DID SOMETHING CHANGE? |
| | 1 | BE CAREFUL! |
| | 1 | ARE YOU KEEPING YOUR EYES FORWARD? |
| | 1 | NICE! |
| | 1 | VERY NICE! |
| | 1 | VERY GOOD! |
| | 0.5 | THAT'S SOME SAFE DRIVING! I LOVE IT! |

| GROUP | OCCURRENCE RATE Rgc (%) | LINES OF DIALOG |
|---|---|---|
| C GROUP (DIALOG NOTIFYING ABOUT BLINKING OF RIGHT BLINKER) | 1.5 | RIGHT, RIGHT! |
| | 1.5 | THE SOUND OF THE BLINKER HAS A NICE RHYTHM, DOESN'T IT? |
| | 1.5 | RIGHT! |
| | 1 | LIGHT? NO, IT'S RIGHT! |
| | 1 | TURNING RIGHT? OR ARE YOU MAKING A LANE CHANGE? |
| | 1 | YOUR RIGHT BLINKER IS ON! |
| | 1 | RIGHT, RIGHT! RIGHT, RIGHT! |
| | 1 | THAT BLINKER SOUND REALLY IS GREAT |
| | 0.5 | THIS IS EXCITING |

38c

VEHICLE COMMUNICATION DEVICE AND NON-TRANSITORY COMPUTER-READABLE RECORDING MEDIUM STORING PROGRAM

TECHNICAL FIELD

The present invention relates to a vehicle communication device that outputs a voice based on vehicle information to an occupant of a vehicle, and to a non-transitory computer-readable recording medium storing a program causing the vehicle communication device to function.

BACKGROUND ART

Conventional technology has been developed that attempts to communicate with a driver of a vehicle, acquire vehicle information of this vehicle in order to realize safe driving by imparting a feeling of affinity with the vehicle, and, according to the acquired vehicle information, display an image of an agent simulating a character or the like on a screen or outputting a voice of this agent from a speaker. For example, JP 3873386 B2 discloses acquiring at least one piece of vehicle information from among the current location of the vehicle, a situation of each section of the vehicle, and an environment of each section of the vehicle, and determining an action (image or voice) of an agent based on the acquired vehicle information.

SUMMARY OF INVENTION

However, with the technology of JP 3873386 B2, when one operation of the vehicle such as a right or left turn or a lane change of the vehicle is started, the agent speaks only one time or an image of the agent is displayed on the screen only one time. That is, in a case where the driver manipulates the steering wheel or blinker of the vehicle in response to a traffic situation, if there is a change in the vehicle information during one operation of the vehicle, the voice is output for the first instance only. Accordingly, even in a case where vehicle information concerning the steering angle of the steering wheel, the blinker, the vehicle velocity, or the like changes from moment to moment, the voice of the agent does not change. Therefore, it is difficult for an occupant such as the driver to feel a greater sense of affinity with the agent and the vehicle.

The present invention has been devised in order to solve this type of problem, and has the object of providing a vehicle communication device and a non-transitory computer-readable recording medium storing a program that can improve the affinity which an occupant feels toward the vehicle and increase the awareness of the occupant for safe driving.

An aspect of the present invention is a vehicle communication device that outputs a voice based on vehicle information to an occupant of a vehicle, including a vehicle information acquiring section configured to acquire, from an ECU of the vehicle, at least one piece of vehicle information from among an ON signal or an OFF signal of a blinker switch provided to the vehicle, a steering angle of a steering wheel provided to the vehicle, and a current vehicle velocity of the vehicle; a dialog storage section configured to store a plurality of lines of dialog; a dialog selecting section configured to select dialog corresponding to the vehicle information, from among the plurality of lines of dialog stored in the dialog storage section; and an output section configured to output the selected dialog as a voice to an inside of the vehicle.

The dialog selecting section, if the vehicle information acquiring section is continuing to acquire the ON signal, when the steering angle is greater than or equal to a prescribed angle or falls within a prescribed angle range and the vehicle velocity is greater than or equal to a threshold value, selects first dialog corresponding to the ON signal, the steering angle, and the vehicle velocity, from among the plurality of lines of dialog, and on the other hand, if the steering angle or the vehicle velocity has changed, selects second dialog, which is different from the first dialog, corresponding to change of the steering angle or the vehicle velocity, from among the plurality of lines of dialog.

Another aspect of the present invention is a non-transitory computer-readable recording medium storing a program that causes a vehicle communication device to function in a manner to output a voice based on vehicle information to an occupant of a vehicle, wherein the vehicle communication device includes a vehicle information acquiring section configured to acquire, from an ECU of the vehicle, at least one piece of vehicle information from among an ON signal or an OFF signal of a blinker switch provided to the vehicle, a steering angle of a steering wheel provided to the vehicle, and a current vehicle velocity of the vehicle; a dialog storage section configured to store a plurality of lines of dialog; a dialog selecting section configured to select dialog corresponding to the vehicle information, from among the plurality of lines of dialog stored in the dialog storage section; and an output section configured to output the selected dialog as a voice to an inside of the vehicle.

The program causes the dialog selecting section to function in a manner to, if the vehicle information acquiring section is continuing to acquire the ON signal, when the steering angle is greater than or equal to a prescribed angle or falls within a prescribed angle range and the vehicle velocity is greater than or equal to a threshold value, select first dialog corresponding to the ON signal, the steering angle, and the vehicle velocity, from among the plurality of lines of dialog, and if the steering angle or the vehicle velocity has changed, select second dialog, which is different from the first dialog, corresponding to change of the steering angle or the vehicle velocity, from among the plurality of lines of dialog.

According to the present invention, while the vehicle is traveling, the second dialog is output as the voice when there is a change in the situation, such as in a case where there is a pedestrian ahead, there is an obstacle ahead, an irregular intersection (e.g., an intersection having an irregular curve) is being traveled through, or a case where there is a change in the manipulation for the left or right turn or the lane change, after voice output of the first dialog. Therefore, the affinity the driver feels for the vehicle is improved by noticing the second dialog. Furthermore, it is possible to improve awareness for safe driving and the importance of the vehicle.

Furthermore, when there is a change in the steering angle of the steering wheel or the vehicle velocity caused by a habit of the driver's manipulation, it is possible to bring the change in the steering angle or the vehicle velocity to the attention of the driver by outputting the second dialog as the voice. Due to this, the driver can be warned to break such a habit, and therefore it is possible to improve skills for safe driving.

BRIEF DESCRIPTION OF DRAWINGS

FIG. 2 is a descriptive diagram of A-group dialog stored in the A-group storage region of the dialog storage section of FIG. 1;

FIG. 3 is a descriptive diagram of B-group dialog stored in the B-group storage region of the dialog storage section of FIG. 1;

FIG. 4 is a descriptive diagram of C-group dialog stored in the C-group storage region of the dialog storage section of FIG. 1;

DESCRIPTION OF EMBODIMENTS

The following describes examples of preferred embodiments of a vehicle communication device and a non-transitory computer-readable recording medium storing a program according to the present embodiment, while referencing the accompanying drawings.

1. Configuration of the Present Embodiment

The configuration of a vehicle communication device 10 according to the present embodiment (also referred to below as a communication device 10 according to the present embodiment) is described below while referencing FIGS. 1 to 5.

Figure 5:
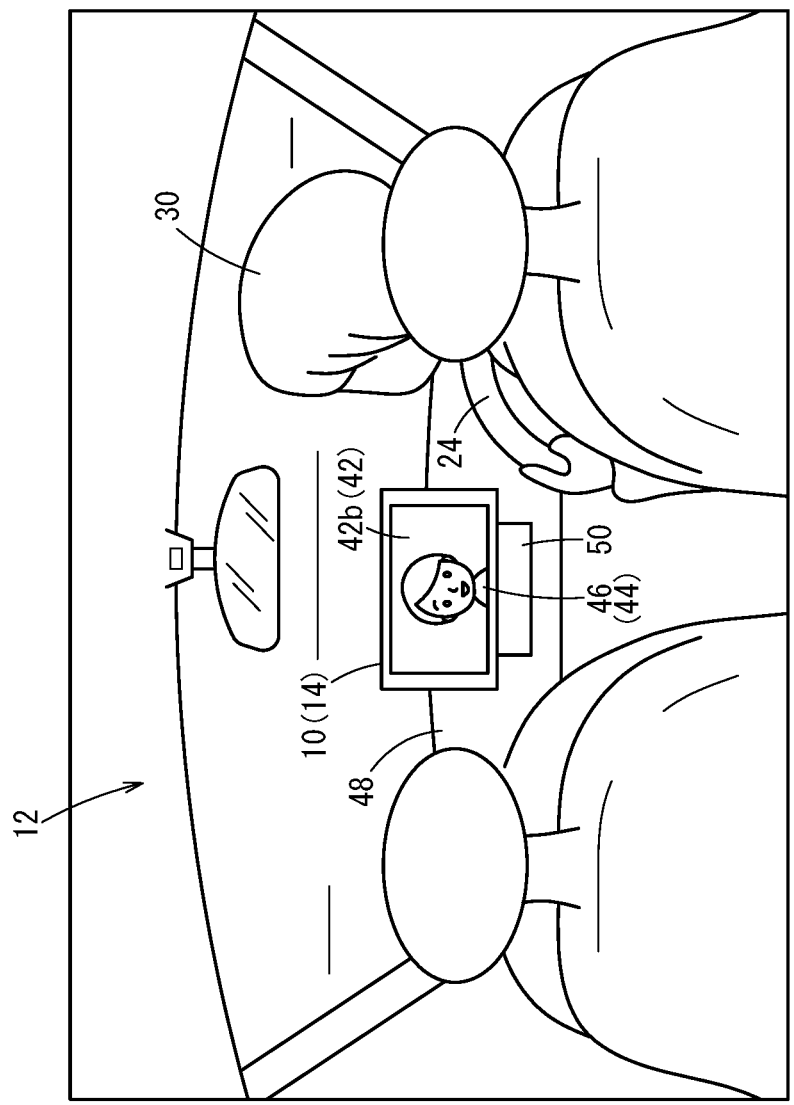
FIG. 5 is a descriptive diagram showing an example of a screen display of the output section of FIG. 1.

The communication device 10 is applied to a mobile device 14 inside a vehicle 12. FIG. 5 shows an example of a case where the vehicle 12 is a four-wheel vehicle, but the vehicle 12 may be another type of vehicle such as a two-wheel or three-wheel vehicle. Furthermore, FIG. 5 shows an example of a case where the mobile device 14 is a smartphone, but the mobile device 14 may be another type of mobile device.

Figure 1:
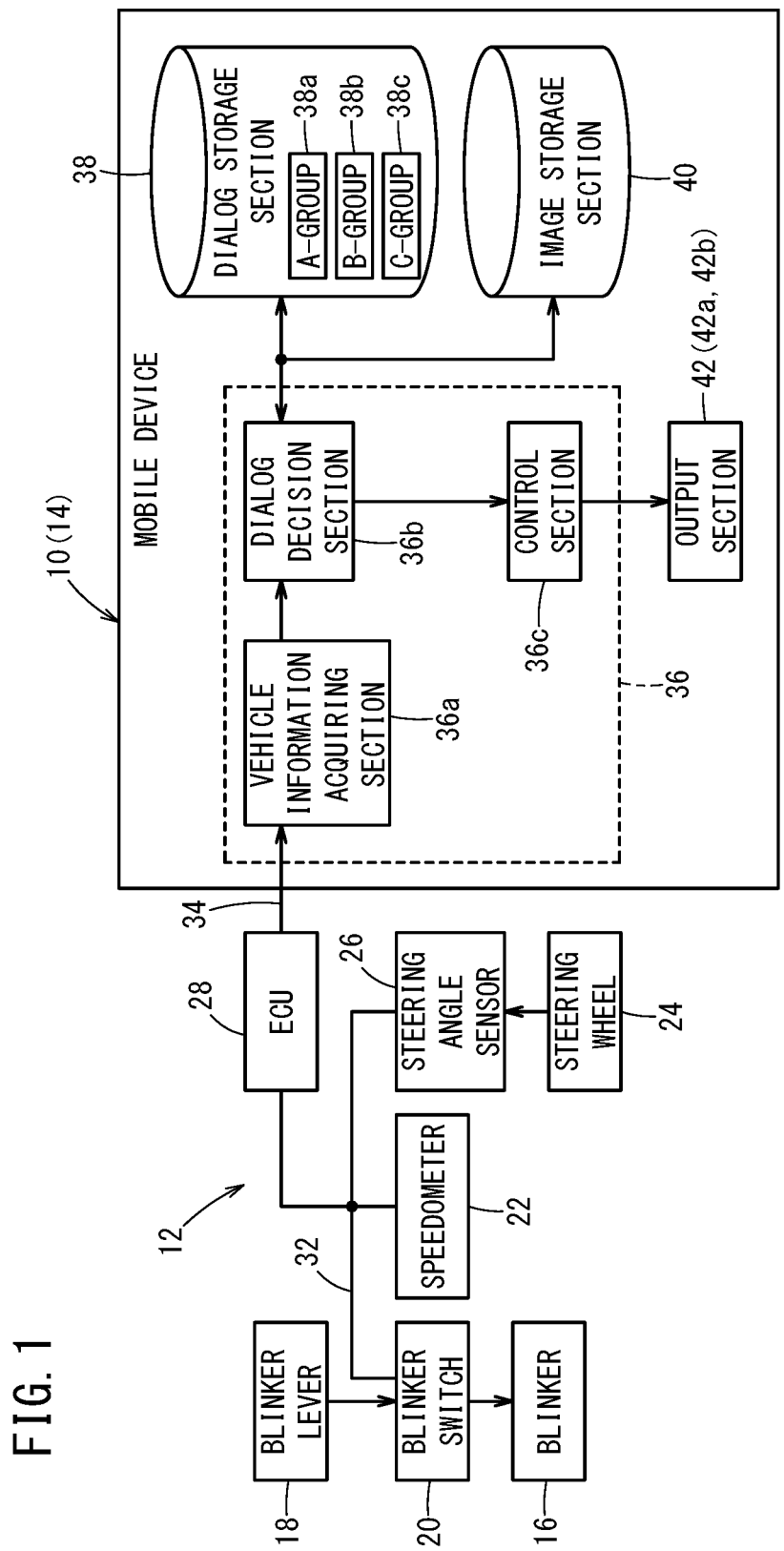
FIG. 1 is a configurational diagram of a communication device according to the present embodiment.

As shown in FIG. 1, the vehicle 12 includes a blinker 16 serving as a direction indicator, a blinker lever 18, a blinker switch 20, a speedometer 22, a steering wheel 24, a steering angle sensor 26, an ECU (Electronic Control Unit) 28, and the like.

In a case where the vehicle 12 makes a left or right turn or a lane change, when a driver 30 (see FIG. 5), who is an occupant, manipulates the blinker lever 18, an ON signal Son (vehicle information) that is a blinking instruction is output from the blinker switch 20 to the blinker 16, and the blinker 16 blinks (ON). On the other hand, after the left or right turn or the lane change, when the driver 30 again manipulates the blinker lever 18, an OFF signal Soff (vehicle information) that is a stop instruction is output from the blinker switch 20 to the blinker 16, and the blinking of the blinker 16 is stopped (OFF).

The speedometer 22 successively detects the vehicle velocity V (vehicle information) of the vehicle 12. The steering angle sensor 26 successively detects a steering angle $\theta$ (vehicle information) of the steering wheel 24 steered by the driver 30.

The blinker switch 20, the speedometer 22, and the steering angle sensor 26 are electrically connected to the ECU 28 via a communication line 32 such as a CAN (Controller Area Network). The ECU 28 controls the various types of electrical components inside the vehicle 12, and acquires various types of information (vehicle information) from the various types of electrical components via the communication line 32. In this case, the blinker switch 20 successively outputs the ON signal Son or the OFF signal Soff to the ECU 28 via the communication line 32. The speedometer 22 successively outputs the detection result of the vehicle velocity V to the ECU 28 via the communication line 32. The steering angle sensor 26 successively outputs the detection result of the steering angle $\theta$ of the steering wheel 24 to the ECU 28 via the communication line 32.

The mobile device 14 is capable of transmitting and receiving various types of information to and from the ECU 28, via the communication line 34. The communication line 34 may be a CAN, or may be another type of communication line 32.

The mobile device 14 includes a processor 36 such as a CPU (Central Processing Unit), a dialog storage section 38 and an image storage section 40 that are memories, and an output section 42 that is a speaker 42a and a screen 42b of the mobile device 14. The processor 36 realizes the functions of a vehicle information acquiring section 36a, a dialog decision section 36b (dialog selecting section), and a control section 36c by executing the program according to the present embodiment stored in a memory (not shown in the drawings).

The vehicle information acquiring section 36a acquires at least one piece of vehicle information among the ON signal Son or OFF signal Soff, the vehicle velocity V, and the steering angle $\theta$, from the ECU 28 via the communication line 34.

The dialog storage section 38 stores a plurality of lines of dialog that can be output as a voice from the speaker 42a of the output section 42. The dialog is voiced by an arbitrary character 44 (see FIG. 5), for example. The dialog storage section 38 includes an A-group storage region 38a (first storage region), a B-group storage region 38b (second storage region), and a C-group storage region 38c (third storage region) for storing the plurality of lines of dialog.

The A-group storage region 38a stores, as A-group dialog (first dialog group), a plurality of lines of dialog (first dialog) corresponding to the ON signal Son, the steering angle $\theta$, and the vehicle velocity V serving as vehicle information acquired by the vehicle information acquiring section 36a when the vehicle 12 turns left or right or makes a lane change. That is, the A-group dialog is dialog corresponding to the above vehicle information, and is dialog for notifying the driver 30 that the vehicle 12 is making a left or right turn or changing lanes, based on the manipulation of the steering wheel 24 or the blinker lever 18 (blinker switch 20) by the driver 30. Therefore, it is possible to prompt the driver 30 to check the manipulation for the left or right turn or lane change of the vehicle 12.

FIG. 2 shows the A-group dialog stored in the A-group storage region 38a. FIG. 2 shows a plurality of lines of dialog for notifying the driver 30 (see FIG. 5) about a manipulation of the steering wheel 24 and the blinker switch 20 by the driver 30 when the vehicle 12 (see FIG. 1) turns right or makes a lane change to the right, as an example. These lines of dialog are each assigned an occurrence rate Rga indicating the frequency of being output as a voice from the speaker 42a of the output section 42, for the vehicle information of the ON signal Son, the steering angle θ, and the vehicle velocity V acquired by the vehicle information acquiring section 36a. That is, the occurrence rate Rga for the A-group dialog refers to the frequency of a given line of the A-group dialog being output as the voice from among all voices that can be output from the speaker 42a according to these pieces of vehicle information.

The B-group storage region 38b stores, as B-group dialog (second dialog group), a plurality of lines of dialog (second dialog) corresponding to the changing steering angle θ or changing vehicle velocity V in a case where the steering angle θ or vehicle velocity V acquired by the vehicle information acquiring section 36a as vehicle information changes while the vehicle 12 is turning left or right or making a lane change. That is, the B-group dialog is dialog corresponding to the above vehicle information, and is dialog for making the driver 30 notice that the steering angle θ or the vehicle velocity V is changing during the left or right turn or the lane change.

The case where the steering angle θ or the vehicle velocity V changes refers to, for example, a case where there is a pedestrian ahead, there is an obstacle ahead, an intersection 52 having an irregular curve or the like is being traveled through, there is a change in the manipulation for the left or right turn or the lane change, or a case where the steering angle θ or the vehicle velocity V changes due to a manipulation habit of the driver 30.

FIG. 3 shows an example of B-group dialog stored in the B-group storage region 38b. These lines of dialog are also each assigned an occurrence rate Rgb, for the change of the steering angle θ or the vehicle velocity V (vehicle information) acquired by the vehicle information acquiring section 36a (see FIG. 1). The occurrence rate Rgb for the B-group dialog refers to the frequency of a given line of the B-group dialog being output as the voice from among all voices that can be output from the speaker 42a according to the change in these pieces of vehicle information.

The C-group storage region 38c stores, as C-group dialog (third dialog group), a plurality of lines of dialog (third dialog) corresponding to the ON signal Son acquired by the vehicle information acquiring section 36a as vehicle information, when the vehicle 12 makes a left or right turn or a lane change. That is, the C-group dialog is dialog corresponding to the above vehicle information, and is dialog for notifying the driver 30 that the blinker 16 is blinking based on the manipulation of the blinker lever 18 (blinker switch 20) by the driver 30.

FIG. 4 shows an example of C-group dialog stored in the C-group storage region 38c. FIG. 4 shows, as an example, a plurality of lines of dialog for notifying the driver 30 (see FIG. 5) that the right-side blinker 16 is blinking due to the manipulation of the blinker switch 20 by the driver 30, when the vehicle 12 (FIG. 1) turns right or makes a lane change to the right. These lines of dialog are also each assigned an occurrence rate Rgc, for the ON signal Son (vehicle information) acquired by the vehicle information acquiring section 36a (see FIG. 1). The occurrence rate Rgc for the C-group dialog refers to the frequency of a given line of the C-group dialog being output as the voice from among all voices that can be output from the speaker 42a according to this vehicle information.

Images 46 corresponding to the plurality of lines of dialog stored in the dialog storage section 38, e.g., images 46 corresponding to the lines of dialog voiced by a character 44 (see FIG. 5) that is a virtual agent, are stored in the image storage section 40. As described above, the plurality of lines of dialog correspond to the vehicle information. Accordingly, the plurality of images 46 stored in the image storage section 40 are also images corresponding to this vehicle information.

The dialog decision section 36b selects dialog corresponding to the vehicle information acquired by the vehicle information acquiring section 36a, from among the plurality of lines of dialog stored in the dialog storage section 38, and decides the selected dialog as the dialog to be output as a voice from the output section 42. That is, the dialog decision section 36b selects the dialog corresponding to the acquired vehicle information from among the A-group storage region 38a, the B-group storage region 38b, and the C-group storage region 38c. Furthermore, the dialog decision section 36b selects the image 46 corresponding to the acquired vehicle information, from among the plurality of images 46 stored in the image storage section 40, and decides the selected image 46 as the image 46 to be displayed in the screen 42b of the output section 42. A detailed method of selecting the dialog and the image 46 corresponding to the vehicle information will be described further below.

The control section 36c, based on the decision of the dialog decision section 36b, outputs the selected dialog as a voice to the inside of the vehicle 12 and controls the output section 42 to display the selected image 46 in the screen 42b.

FIG. 5 shows an example of a display screen of the mobile device 14 arranged inside the vehicle 12. The mobile device 14 is fixed to a holder 50 arranged on a top surface of a dashboard 48, in a state where the screen 42b faces backward (i.e., toward the driver 30 side). In this case, the image 46 of the character 44 is displayed in the screen 42b that is the output section 42 (see FIG. 1). Accordingly, the driver 30 can easily see the image 46 of the character 44, and can hear the voice (speech of the character 44) output from the speaker 42a of the mobile device 14.

2. Operation of the Present Embodiment

The following describes an operation of the non-transitory computer-readable recording medium storing the program and the communication device 10 according to the present embodiment, while referencing FIGS. 6 to 14. In the description of this operation, FIGS. 1 to 5 are also referenced as necessary. Here, a first embodiment example (see FIGS. 6 to 10) of a case where the vehicle 12 turns right or left in an intersection 52 and a second embodiment example (see FIGS. 11 to 14) of a case where the vehicle 12 makes a lane change are described, as operations of the communication device 10.

2.1. First Embodiment Example

The first embodiment example is described while referencing FIGS. 6 to 10.

Figure 6:
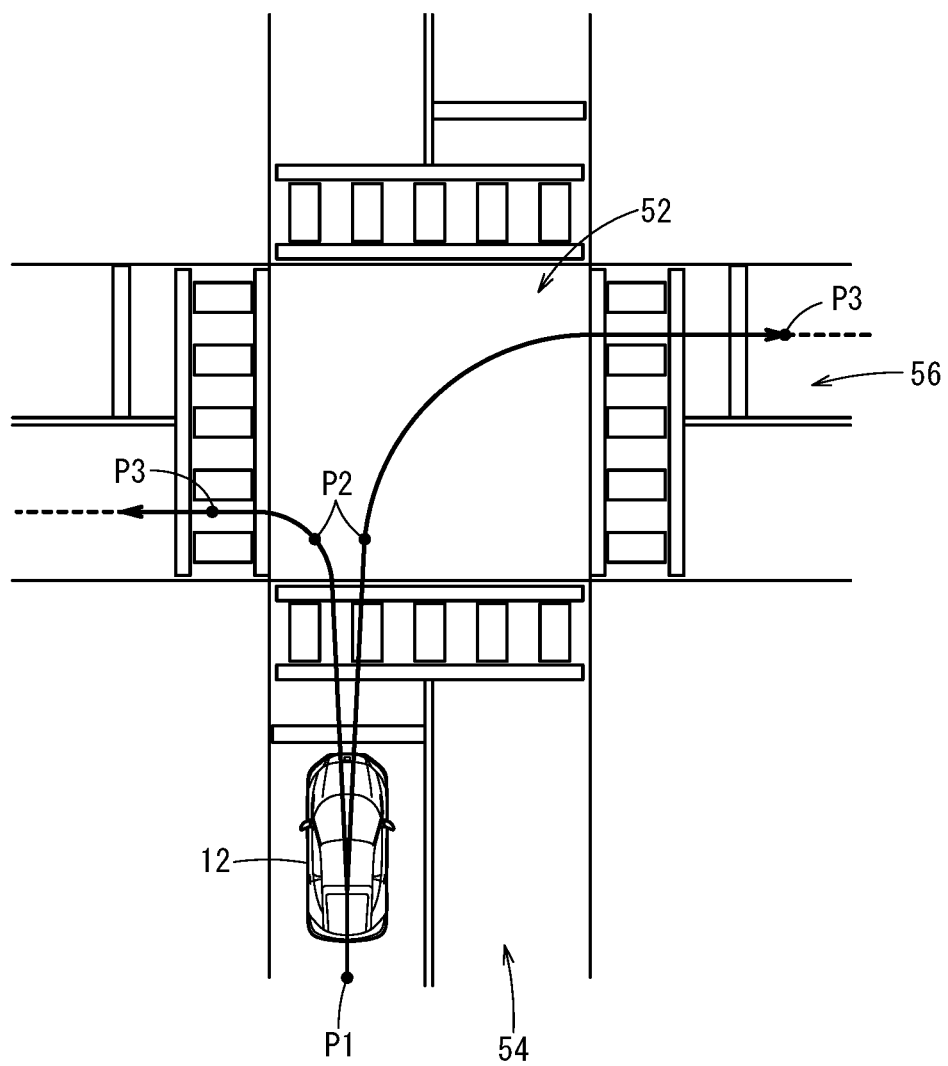
FIG. 6 is a descriptive diagram showing a left or right turn of the vehicle at an intersection (first embodiment example)

FIG. 6 shows the intersection 52 at which the vehicle 12 turns left or right. At the intersection 52, a first road 54 on which the vehicle 12 is travelling intersects a second road 56. The first embodiment example is an operation of the communication device 10 when the vehicle 12 travelling on the first road 54 enters into the intersection 52 and makes a right or left turn to travel on the second road 56.

In this case, the vehicle 12 causes the blinker 16 to blink (ON) at a first location P1 that is in front of the intersection 52 in the first road 54, then starts turning left or right at a second location P2 within the intersection 52 while keeping the blinker 16 in the ON state, and then stops the blinking of the blinker 16 (OFF) at a third location P3 on the second road 56 after passing through the intersection 52. Accordingly, for one operation of a right or left turn, the vehicle 12 starts the operation at the first location P1 and ends the operation at the third location P3.

Figure 7:
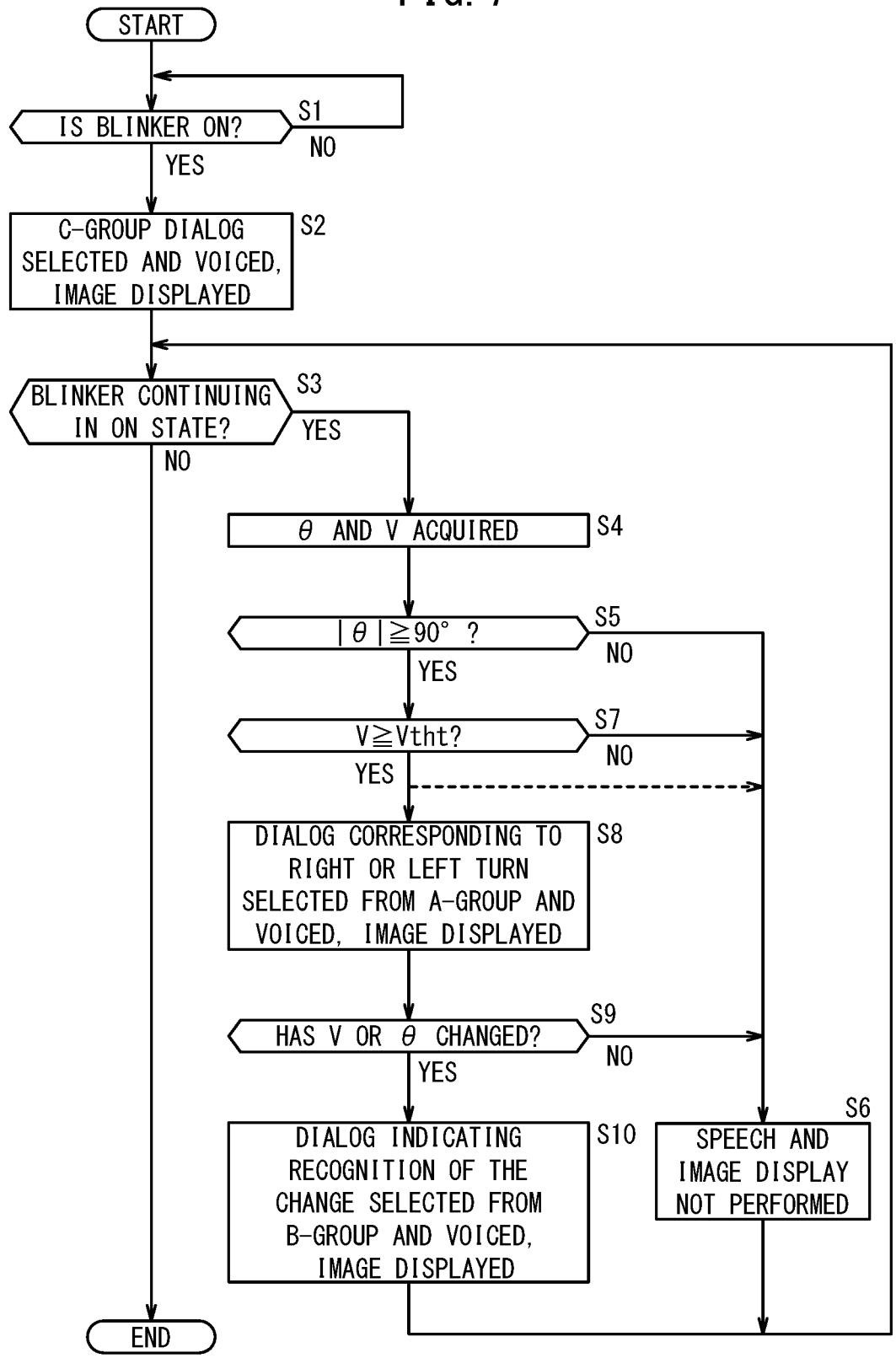
FIG. 7 is a flow chart showing an operation of the first embodiment example.

FIG. 7 is a flow chart of such an operation of the first embodiment example.

First, when the vehicle 12 (see FIG. 6) is travelling on the first road 54 toward the intersection 52, at step S1, the dialog decision section 36b (see FIG. 1) determines whether the blinker 16 is ON (blinking).

Here, when the vehicle 12 reaches the first location P1 and the driver 30 manipulates the blinker lever 18, the ON signal Son is output from the blinker switch 20 to the blinker 16, and the blinker 16 blinks. In this case, the ECU 28 acquires the ON signal Son from the blinker switch 20 via the communication line 32. The vehicle information acquiring section 36a acquires the ON signal Son from the ECU 28 via the communication line 34, and outputs the acquired ON signal Son to the dialog decision section 36b. Accordingly, when the ON signal Son has been input from the vehicle information acquiring section 36a, the dialog decision section 36b recognizes that the blinker 16 is ON (step S1: YES).

At the following step S2, since the vehicle information acquired by the vehicle information acquiring section 36a is the ON signal Son, the dialog decision section 36b selects an arbitrary line of dialog corresponding to this ON signal Son from the C-group storage region 38c of the dialog storage section 38, and decides the selected dialog as the dialog to be output from the speaker 42a of the output section 42. Furthermore, the dialog decision section 36b selects, from the image storage section 40, an arbitrary image 46 corresponding to the ON signal Son acquired by the vehicle information acquiring section 36a, and decides the selected image 46 as the dialog to be displayed in the screen 42b of the output section 42. Due to this, the control section 36c controls the output section 42 and outputs the selected dialog as a voice to the inside of the vehicle 12 from the speaker 42a of the output section 42, and displays the selected image 46 in the screen 42b (see FIGS. 1 and 5) of the output section 42.

At the following step S3, the dialog decision section 36b determines whether the blinker 16 is remaining in the ON state, that is, whether the vehicle information acquiring section 36a is continuing to acquire the ON signal Son. In this case, the vehicle 12 has passed the first location P1 but has not yet arrived at the third location P3. Accordingly, the blinker 16 remains in the ON state and the vehicle information acquiring section 36a continues to acquire the ON signal Son from the ECU 28 via the communication line 34 (step S3: YES). Due to this, the dialog decision section 36b proceeds to the following step S4.

It should be noted that the ECU 28 successively acquires, via the communication line 32, the ON signal Son from the blinker switch 20, the vehicle velocity V of the vehicle 12 from the speedometer 22, and the steering angle θ of the steering wheel 24 from the steering angle sensor 26. Accordingly, at step S4, the vehicle information acquiring section 36a acquires the current steering angle θ and vehicle velocity V. It is obvious that, at step S4, the vehicle information acquiring section 36a acquires the ON signal Son along with the current steering angle θ and vehicle velocity V.

Figure 8:
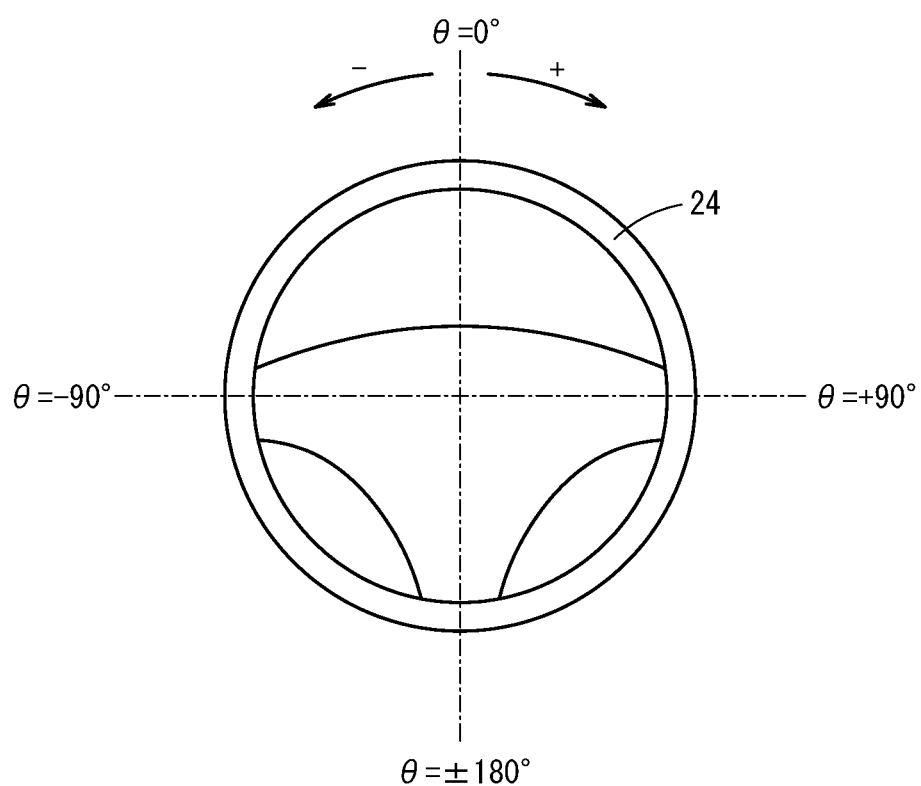
FIG. 8 is a descriptive diagram of the steering angle of the steering wheel.

At step S5, the dialog decision section 36b determines whether the absolute value |θ| of the steering angle θ acquired by the vehicle information acquiring section 36a is greater than or equal to 90°. This is because, as shown in FIG. 8, for the steering angle θ of the steering wheel 24, there is a positive-direction steering angle θ when the steering wheel 24 is rotated in the clockwise direction and a negative-direction steering angle θ when the steering wheel 24 is rotated in the counter-clockwise direction, in the plane of FIG. 8, relative to a neutral position (θ=0°). It is possible for the vehicle 12 to turn right by having the driver 30 rotate the steering wheel 24 in the positive direction, and it is possible for the vehicle 12 to turn left by having the driver 30 rotate the steering wheel 24 in the negative direction.

Here, when the vehicle 12 (see FIGS. 1 and 6) has passed through the first location P1 and is travelling on the first road 54 or immediately after the vehicle 12 has entered into the intersection 52, the absolute value |θ| of the steering angle θ is less than 90° (step S5: NO), and therefore the dialog decision section 36b determines that the steering angle θ necessary for a right or left turn within the intersection 52 has not been reached, and proceeds to step S6 of FIG. 7. At step S6, the dialog decision section 36b determines that the output of the voice and the image 46 from the output section 42 is not to be performed, and returns to step S3. Accordingly, the communication device 10 repeatedly performs the processing of steps S3 to S6, until the vehicle 12 turns right or left in the intersection 52.

Next, the vehicle 12 enters into the intersection 52, and at the second location P2, the driver 30 turns the steering wheel 24 in the clockwise direction or counter-clockwise direction of FIG. 8, in order to turn the vehicle 12 left or right. Due to this, if |θ|≥90° (step S5: YES), the dialog decision section 36b (see FIG. 1) determines that the vehicle 12 (see FIGS. 1 and 6) has started the left or right turn in the intersection 52, and moves to step S7 of FIG. 7.

At step S7, the dialog decision section 36b determines whether the vehicle velocity V is greater than or equal to a threshold value Vtht. The threshold value Vtht refers to the minimum vehicle velocity needed for the vehicle 12 to turn left or right in the intersection 52. Vtht is set to 10 km/h, for example. If V≥Vtht (step S7: YES), the dialog decision section 36b determines that the vehicle 12 is in the midst of turning left or right in the intersection 52, and proceeds to step S8.

At step S8, since the ON signal Son is continuing to be acquired (step S3: YES), |θ|≥90° (step S5: YES), and V≥Vtht (step S7: YES), the dialog decision section 36b determines that the output of the voice and the image 46 from the output section 42 is to be performed.

Next, the dialog decision section 36b selects the dialog corresponding to the ON signal Son, the steering angle θ, and the vehicle velocity V from the A-group storage region 38a of the dialog storage section 38, and decides the selected dialog as the dialog to be output as the voice from the output section 42. Furthermore, the dialog decision section 36b selects the image 46 corresponding to the ON signal Son, the steering angle θ, and the vehicle velocity V from the image storage section 40, and decides the selected image 46 as the image 46 to be displayed in the screen 42b of the output section 42.

Due to this, the control section 36c causes the dialog decided by the dialog decision section 36b to be output to the inside of the vehicle 12 as a voice from the speaker 42a of the output section 42, and causes the image 46 decided by the dialog decision section 36b to be displayed in the screen 42b of the output section 42 (see FIGS. 1 and 5). As a result, the driver 30 can recognize that the vehicle 12 is in the midst of turning left or right by hearing the output voice and seeing the displayed image 46.

Figure 9:
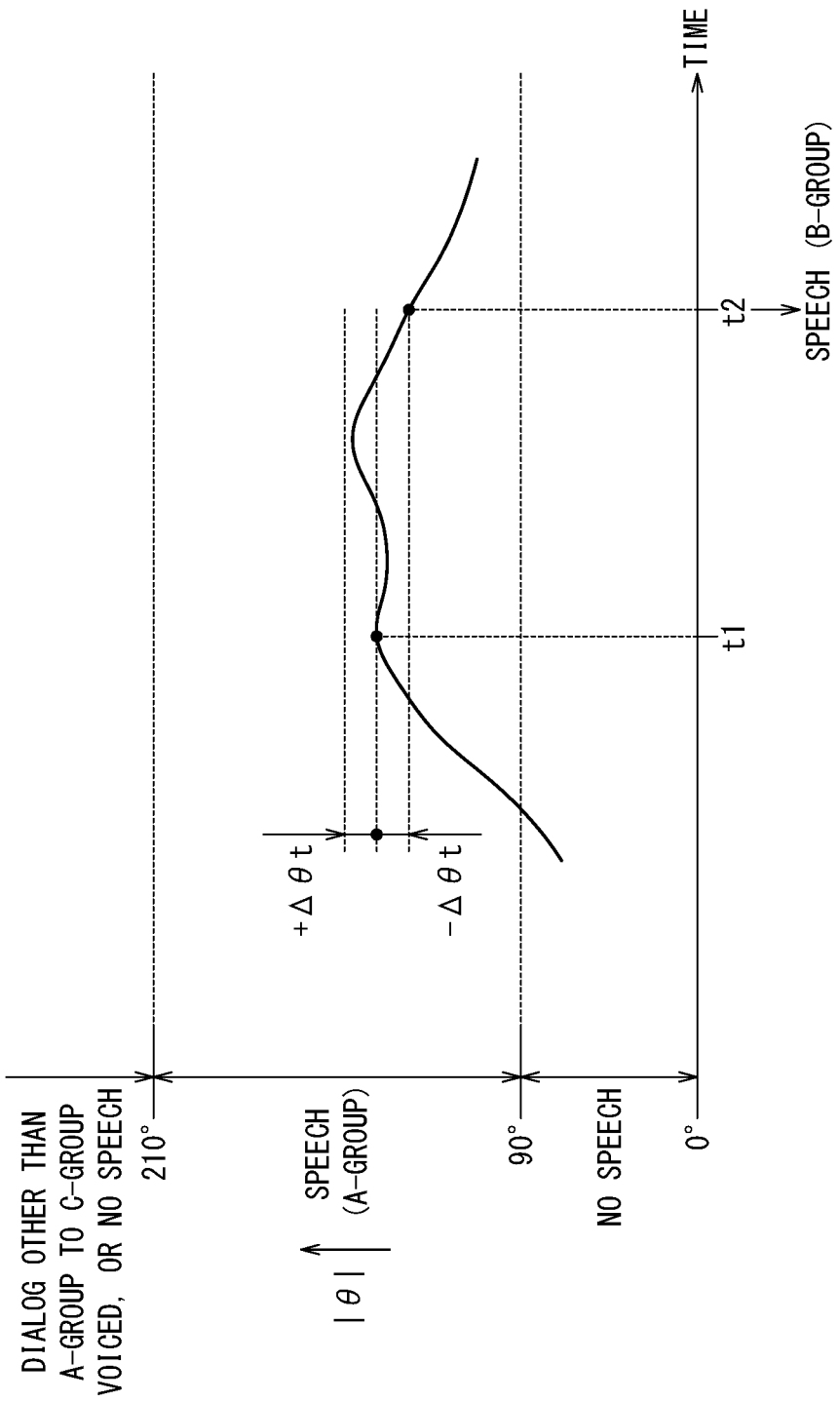
FIG. 9 is a timing chart showing a change of the steering angle of the steering wheel in the first embodiment example.
Figure 10:
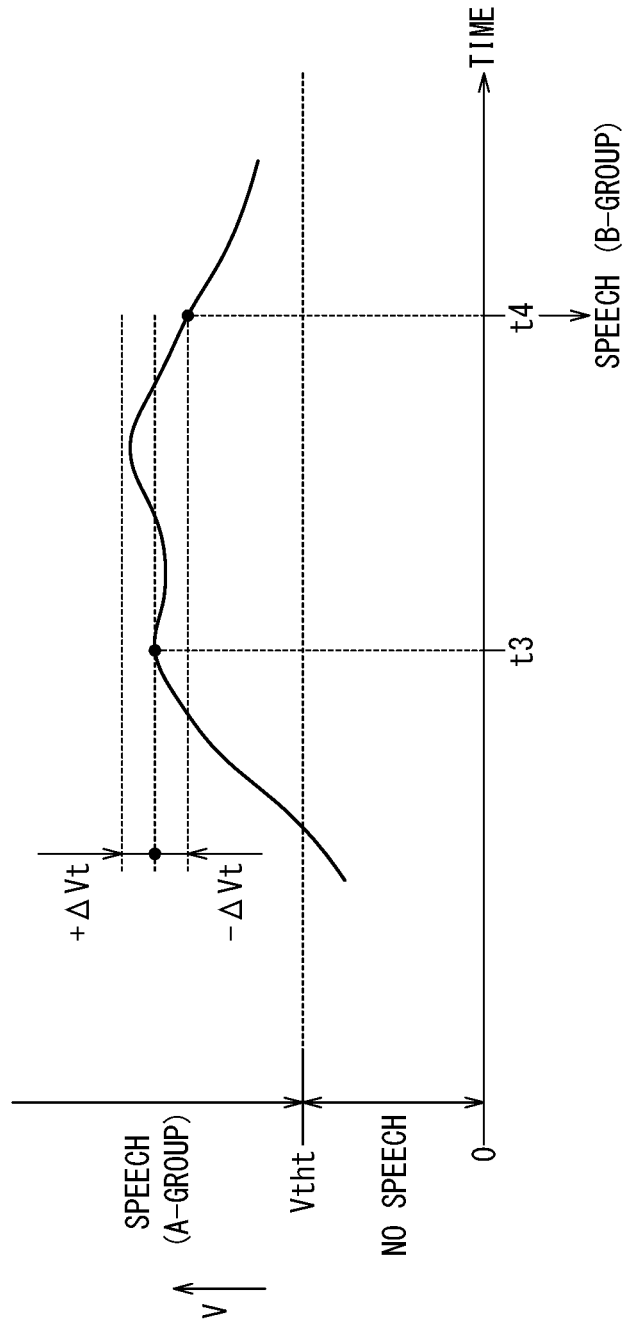
FIG. 10 is a timing chart showing a change of the vehicle velocity in the first embodiment example.

At the following step S9, the dialog decision section 36b determines whether the vehicle velocity V or the steering angle θ has changed during the left or right turning of the vehicle 12. FIG. 9 is a timing chart showing the change of the steering angle θ, and FIG. 10 is a timing chart showing the change of the vehicle velocity V.

In FIG. 9, in a case where |θ|≥90°, with the absolute value |θ| of the steering angle θ at the timing t1 as a reference value, if the absolute value |θ| of the steering angle θ relative to the reference value stays within a range of ±Δθt (e.g., ±Δθt=±2°) over time, the dialog decision section 36b (see FIG. 1) determines that a change of the steering angle θ is not occurring (step S9 of FIG. 7: NO).

On the other hand, if the absolute value |θ| of the steering angle θ relative to the reference value falls outside the range of ±Δθt over time, e.g., if the absolute value |θ| of the steering angle θ at the timing t2 becomes at least Δθt less than the reference value, the dialog decision section 36b determines that a change of the steering angle θ is occurring (step S9: YES).

The timing t1, which is the starting point of the determination process for the steering angle θ, is a timing at which the vehicle 12 has temporarily stopped, for example. Furthermore, as an example of a case where a change in the steering angle θ occurs, there is a case where the driver 30 turns the steering wheel 24 in the clockwise direction or counter-clockwise direction of FIG. 8 more than necessary during the left or right turning of the vehicle 12.

Furthermore, in FIG. 10, in a case where V≥Vtht, with the vehicle velocity V at the timing t3 as a reference value, if the vehicle velocity V remains within a range of ±ΔVt (e.g., ±ΔVt=±2 km/h) relative to the reference value over time, the dialog decision section 36b (see FIG. 1) determines that a change of the vehicle velocity V is not occurring (step S9 of FIG. 7: NO).

On the other hand, if the vehicle velocity V falls outside the range of ±ΔVt over time, e.g., if the vehicle velocity V at the timing t4 becomes at least ΔVt less than the reference value, the dialog decision section 36b determines that a change of the vehicle velocity V is occurring (step S9: YES).

The timing t3, which is the starting point of the determination process for the vehicle velocity V, is a timing at which the vehicle 12 has reached a prescribed vehicle velocity, for example. Furthermore, as an example of a case where a change in the vehicle velocity V occurs, there is a case where the vehicle 12 decelerates or stops in the intersection 52 due to the presence of an oncoming vehicle during the left or right turning of the vehicle 12.

In this way, at step S9, if it is determined that there is no change in the vehicle velocity V or the steering angle θ (step S9: NO), the process moves to step S6, and the dialog decision section 36b temporarily stops the output of the voice and the image 46 from the output section 42. After this, the communication device 10 returns to step S3, and repeatedly performs the processing of steps S3 to S9.

On the other hand, at step S9, if it is determined that there is a change in the vehicle velocity V or the steering angle θ (step S9: YES), the process moves to step S10, and the dialog decision section 36b determines that the voice and the image 46 indicating that there is a change in the vehicle velocity V or in the steering angle θ are to be output from the output section 42.

Next, the dialog decision section 36b selects the dialog corresponding to the change of the vehicle velocity V or the steering angle θ from the B-group storage region 38b of the dialog storage section 38, and decides the selected dialog as the dialog to be output as the voice from the output section 42. Furthermore, the dialog decision section 36b selects the image 46 corresponding to the change of the vehicle velocity V or the steering angle θ from the image storage section 40, and decides the selected image 46 as the image 46 to be displayed in the screen 42b of the output section 42.

Due to this, the control section 36c causes the dialog decided by the dialog decision section 36b to be output as the voice to the inside of the vehicle 12 from the speaker 42a of the output section 42, and causes the image 46 decided by the dialog decision section 36b to be displayed on the screen 42b of the output section 42 (see FIGS. 1 and 5). As a result, the driver 30 can recognize that there is a change in the vehicle velocity V or the steering angle θ occurring during the left or right turning of the vehicle 12 by hearing the output voice and seeing the displayed image 46. After this, the communication device 10 returns to step S3, and repeatedly performs the processing of steps S3 to S10.

Accordingly, by repeatedly performing the processing of steps S3 to S10 while the vehicle 12 turns left or right from the second location P2, an image 46 and a voice that are in accordance with a condition that changes moment to moment can be successively output from the output section 42 during one operation of the left or right turn. In practice, when the voice is output from the output section 42 many times, there is a possibility that the driver 30 will feel annoyed. Therefore, after the output of the image 46 and the voice has been performed once, by moving to step S6 after there is an affirmative determination process at step S7 (step S7: YES), as shown by the broken line in FIG. 7, it is possible for the voice output to be performed only once.

Then, when the vehicle 12 has turned right or left and reached the third location P3 to be travelling on the second road 56, when the driver 30 manipulates the blinker lever 18 and the OFF signal Soff is output from the blinker switch 20 to the blinker 16, the blinker 16 stops blinking (OFF). In this case, the ECU 28 acquires the OFF signal Soff from the blinker switch 20 via the communication line 32. The vehicle information acquiring section 36a acquires the OFF signal Soff from the ECU 28 via the communication line 34.

Due to this, at step S3, the dialog decision section 36b determines that the blinker 16 has transitioned from the ON state to the OFF state based on the vehicle information acquiring section 36a having acquired the OFF signal Soff (step S3: NO). As a result, the communication device 10 ends the operation relating to the left or right turning of the vehicle 12.

It should be noted that, in the first embodiment example, at step S5 of FIG. 7, a determination is made concerning whether the absolute value |θ| of the steering angle θ is within a range of 90° to 210°. In this case, as shown in FIG. 9, if 90°≤|θ|≤210° (step S5: YES), the process of step S7 is performed. On the other hand, if the absolute value |θ| of the steering angle θ is outside of the range from 90° to 210° (step S5: NO), the process of step S6 is performed.

In this case, if |θ|>210° (step S5: NO), at step S6, the dialog decision section 36b (see FIG. 1) may determine that dialog other than the A-group to C-group dialog is to be output as the voice. In this case, there is a possibility that the vehicle 12 is turning suddenly. Therefore, it is possible to alert the driver 30 by having the output section 42 output different dialog as the voice to the inside of the vehicle 12.

2.2. Second Embodiment Example

The second embodiment example is described while referencing FIGS. 11 to 14. In the description of the operation of the second embodiment example, description concerning operations similar to those of the first embodiment example is omitted or abbreviated.

Figure 11:
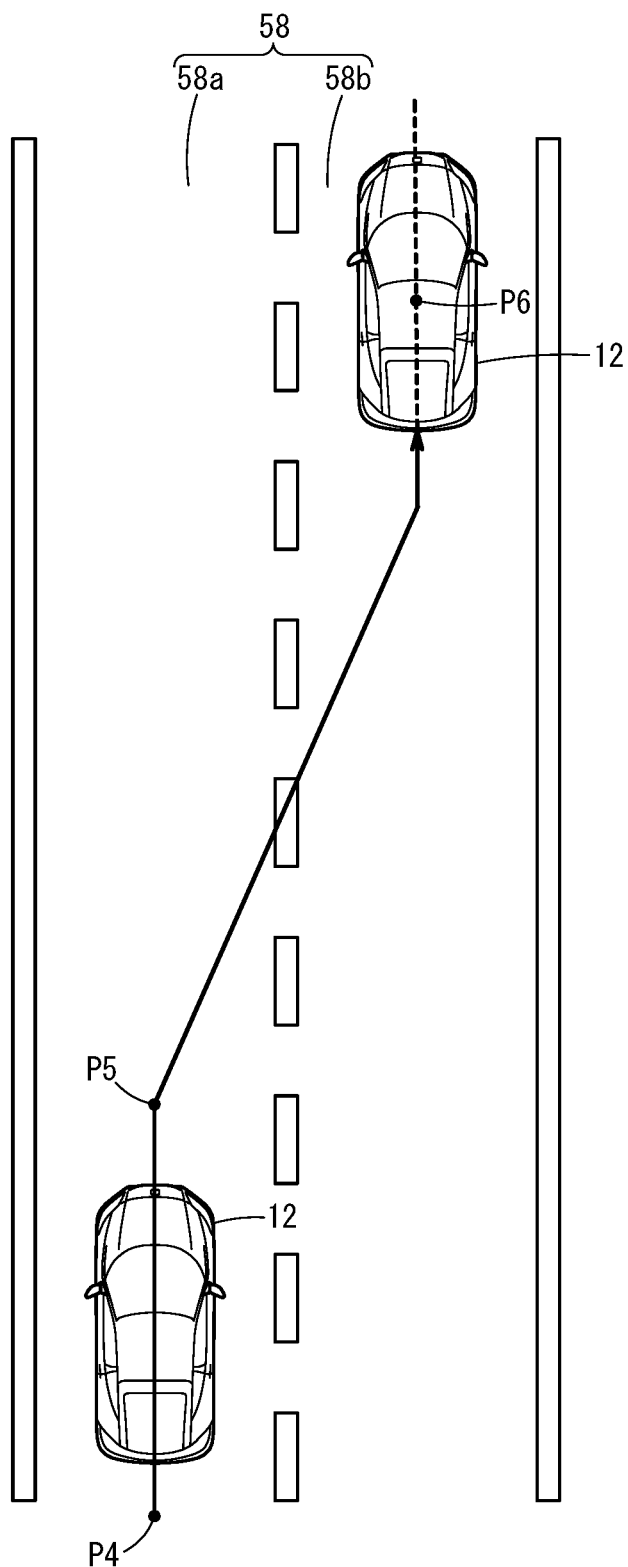
FIG. 11 is a descriptive diagram showing a lane change of the vehicle (second embodiment example)

As shown in FIG. 11, the second embodiment example is an operation of the communication device 10 when the vehicle 12 is in a two-lane third road 58 and makes a lane change from one lane 58a to the other lane 58b, for example.

In this case, the vehicle 12 causes the blinker 16 to blink (ON) at a fourth location P4 in the one lane 58a, then starts a lane change at a fifth location P5 while keeping the blinker 16 in the ON state, and then completes the lane change to the other lane 58b after stopping the blinking of the blinker 16 (OFF) at a sixth location P6. Accordingly, for one operation of a lane change, the vehicle 12 starts the operation at the fourth location P4 and ends the operation at the sixth location P6.

Figure 12:
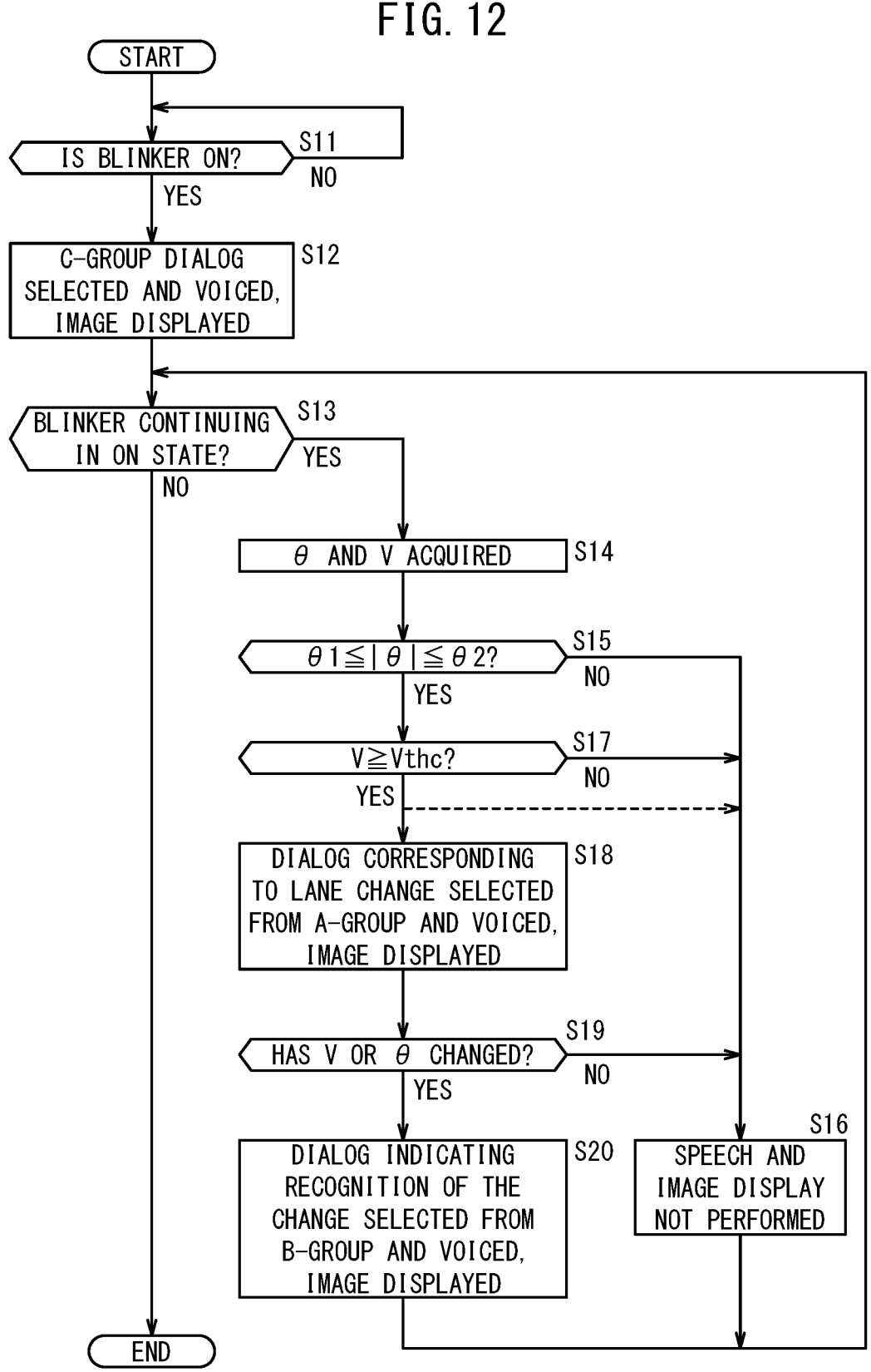
FIG. 12 is a flow chart showing an operation of the second embodiment example.

FIG. 12 is a flow chart of such an operation of the second embodiment example.

First, when the vehicle 12 is travelling in the one lane 58a, at step S11, the dialog decision section 36b determines whether the blinker 16 is ON (blinking), in the same manner as in step S1 of FIG. 7. In this case, if the vehicle 12 has reached the fourth location P4 (see FIG. 11), the blinker 16 is blinking due to the driver 30 manipulating the blinker lever 18 (see FIG. 1), and the vehicle information acquiring section 36a has acquired the ON signal Son, then the dialog decision section 36b recognizes that the blinker 16 is ON (step S11: YES) and proceeds to the following step S12.

At step S12, in the same manner as in step S2 of FIG. 7, the dialog decision section 36b selects an arbitrary line of dialog corresponding to the ON signal Son from the C-group storage region 38c of the dialog storage section 38 based on the ON signal Son acquired by the vehicle information acquiring section 36a, and decides the selected dialog as the dialog to be output from the speaker 42a of the output section 42. Furthermore, the dialog decision section 36b selects an arbitrary image 46 corresponding to the ON signal Son acquired by the vehicle information acquiring section 36a from the image storage section 40, and decides the selected image 46 as the dialog to be displayed in the screen 42b of the output section 42. The control section 36c controls the output section 42 to output the decided dialog as a voice to the inside of the vehicle 12 from the speaker 42a of the output section 42 and to display the decided image 46 in the screen 42b of the output section 42.

At step S13, the dialog decision section 36b determines whether the blinker 16 is remaining in the ON state, in the same manner as in step S3 of FIG. 7. In this case, the vehicle 12 has passed the fourth location P4 but has not yet arrived at the sixth location P6. Furthermore, the blinker 16 remains in the ON state and the vehicle information acquiring section 36a continues to acquire the ON signal Son (step S13: YES). Accordingly, at step S14, the vehicle information acquiring section 36a acquires the steering angle θ and the vehicle velocity V from the ECU 28 via the communication line 34, in the same manner as in step S4 of FIG. 7.

Figure 13:
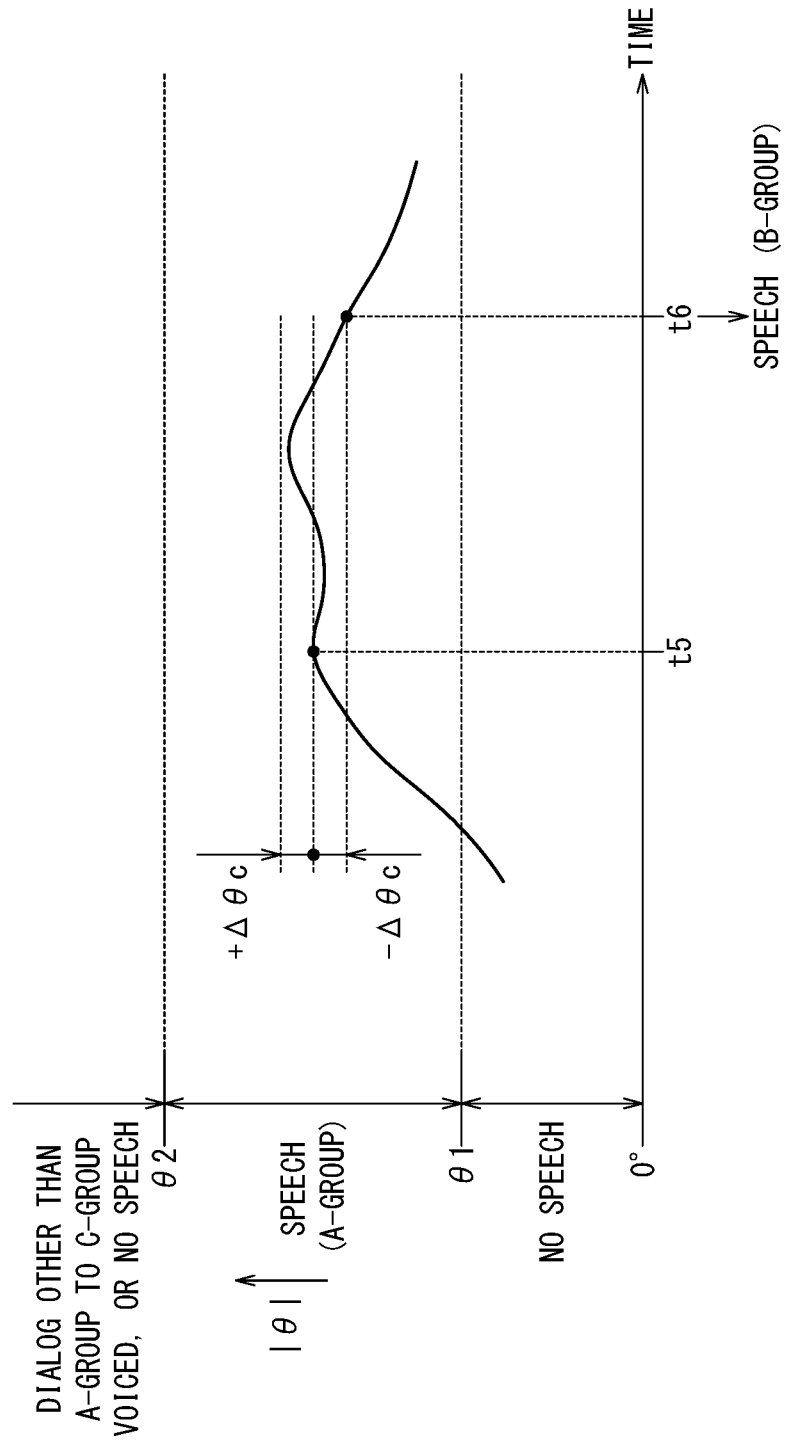
FIG. 13 is a timing chart showing a change of the steering angle of the steering wheel in the second embodiment example.

At step S15, the dialog decision section 36b determines whether the absolute value |θ| of the steering angle θ acquired by the vehicle information acquiring section 36a is within a prescribed angle range (the range from θ1 to θ2 shown in FIG. 13). From the fourth location P4 to the fifth location P5, the vehicle 12 travels in a straight line in the one lane 58a (step S15: NO), and therefore the dialog decision section 36b determines that the steering angle θ needed for a lane change has not been reached, and moves to step S16. Here, θ1 and θ2 are set as θ1=6° and θ2=15°, for example.

At step S16, in the same manner as in step S6 of FIG. 7, the dialog decision section 36b determines that the output of the voice and the image 46 from the output section 42 is not to be performed, and returns to step S13. Due to this, the communication device 10 repeatedly performs the processing of steps S13 to S16 until the vehicle 12 starts the lane change.

Next, when the vehicle 12 reaches the fifth location P5, the driver 30 turns the steering wheel 24 in the clockwise direction of FIG. 8 to make a lane change to the other lane 58b. Due to this, if θ1≤|θ|≤θ2 (step S15: YES), the dialog decision section 36b determines that the vehicle 12 has started the lane change, and moves to step S17.

At step S17, the dialog decision section 36b determines whether V≥Vthc, in the same manner as in step S7 of FIG. 7. The threshold value Vthc refers to the minimum vehicle velocity needed for the vehicle 12 to make a lane change. Vthc is set to 30 km/h, for example. If V≥Vthc (step S17: YES), the dialog decision section 36b determines that the vehicle 12 is in the midst of a lane change, and moves to the following step S18.

At step S18, the ON signal Son continues to be acquired (step S13: YES), θ1≤|θ|≤θ2 (step S15: YES), and V≥Vthc (step S17: YES), and therefore the dialog decision section 36b determines that the output of the voice and the image 46 from the output section 42 is to be performed.

Next, in the same manner as in step S8 of FIG. 7, the dialog decision section 36b selects the dialog corresponding to the ON signal Son, the steering angle θ, and the vehicle velocity V from the A-group storage region 38a of the dialog storage section 38, and decides the selected dialog as the dialog to be output as the voice from the output section 42. Furthermore, the dialog decision section 36b selects the image 46 corresponding to the ON signal Son, the steering angle θ, and the vehicle velocity V from the image storage section 40, and decides the selected image 46 as the image 46 to be displayed in the screen 42b of the output section 42.

Due to this, the control section 36c causes the dialog decided by the dialog decision section 36b to be output to the inside of the vehicle 12 as a voice from the speaker 42a of the output section 42, and causes the image 46 decided by the dialog decision section 36b to be displayed in the screen 42b of the output section 42. As a result, the driver 30 can recognize that the vehicle 12 is in the midst of a lane change by hearing the output voice and seeing the displayed image 46.

Figure 14:
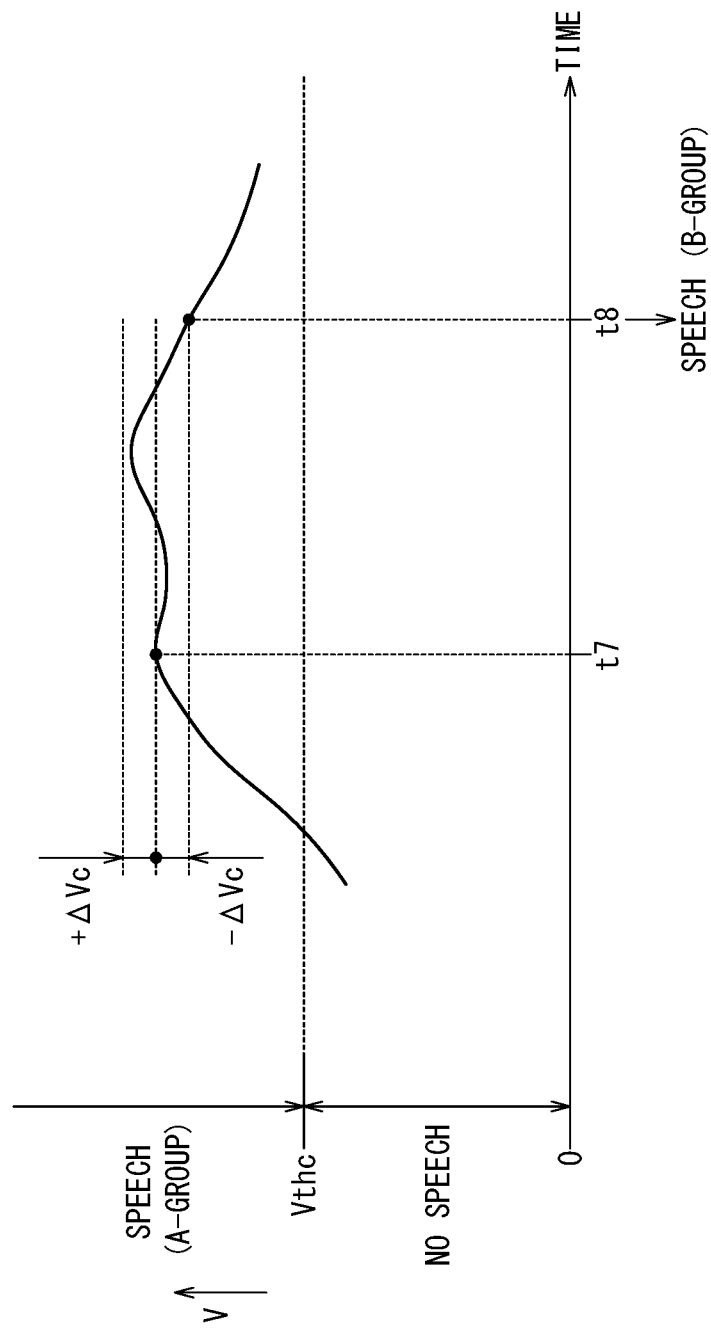
FIG. 14 is a timing chart showing a change of the vehicle velocity in the second embodiment example.

At the following step S19, in the same manner as in step S9 of FIG. 7, the dialog decision section 36b determines whether the vehicle velocity V or the steering angle θ has changed during the lane change of the vehicle 12. FIG. 13 is a timing chart showing the change of the steering angle θ, and FIG. 14 is a timing chart showing the change of the vehicle velocity V.

In FIG. 13, in a case where θ1≤|θ|≤θ2, with the absolute value |θ| of the steering angle θ at the timing t5 as a reference value, if the absolute value |θ| of the steering angle θ relative to the reference value stays within a range of ±Δθc (e.g., ±Δθc=±0.5°) over time, the dialog decision section 36b (see FIG. 1) determines that a change of the steering angle θ is not occurring (step S19 of FIG. 12: NO).

On the other hand, if the absolute value |θ| of the steering angle θ relative to the reference value falls outside the range of ±Δθc over time, e.g., if the absolute value |θ| of the steering angle θ at the timing t6 becomes at least Δθc less than the reference value, the dialog decision section 36b determines that a change of the steering angle θ is occurring (step S19: YES).

As an example of a case where a change in the steering angle θ occurs, there is a case where the driver 30 turns the steering wheel 24 in the clockwise direction or the counterclockwise direction of FIG. 8 more than necessary during the lane change of the vehicle 12.

Furthermore, in FIG. 14, in a case where V≥Vthc, with the vehicle velocity V at the timing t7 as a reference value, if the vehicle velocity V remains within a range of ±ΔVc (e.g., ±ΔVc=±5 km/h) relative to the reference value over time, the dialog decision section 36b (see FIG. 1) determines that a change of the vehicle velocity V is not occurring (step S19 of FIG. 12: NO).

Furthermore, if the vehicle velocity V falls outside the range of ±ΔVc over time, e.g., if the vehicle velocity V at the timing t8 becomes at least ΔVc less than the reference value, the dialog decision section 36b determines that a change of the vehicle velocity V is occurring (step S19: YES).

As an example of a case where a change in the vehicle velocity V occurs, there is a case where the velocity of the vehicle 12 is adjusted due to the presence of another vehicle travelling in the other lane 58b during the lane change of the vehicle 12.

In this way, at step S19, if it is determined that there is no change in the vehicle velocity V or the steering angle θ (step S19: NO), the process moves to step S16, and the dialog decision section 36b temporarily stops the output of the voice and the image 46 from the output section 42. After this, the communication device 10 returns to step S13, and repeatedly performs the processing of steps S13 to S19.

On the other hand, at step S19, if it is determined that there is a change in the vehicle velocity V or the steering angle θ (step S19: YES), the process moves to step S20, and the dialog decision section 36b determines that the voice and the image 46 indicating that there is a change in the vehicle velocity V or the steering angle θ is to be output from the output section 42, in the same manner as in step S10 of FIG. 7.

Next, the dialog decision section 36b selects the dialog corresponding to the change of the vehicle velocity V or the steering angle θ from the B-group storage region 38b of the dialog storage section 38, and decides the selected dialog as the dialog to be output as the voice from the output section 42. Furthermore, the dialog decision section 36b selects the image 46 corresponding to the change of the vehicle velocity V or the steering angle θ from the image storage section 40, and decides the selected image 46 as the image 46 to be displayed in the screen 42b of the output section 42.

Due to this, the control section 36c causes the dialog decided by the dialog decision section 36b to be output as the voice to the inside of the vehicle 12 from the speaker 42a of the output section 42, and causes the image 46 decided by the dialog decision section 36b to be displayed in the screen 42b of the output section 42. As a result, the driver 30 can recognize that there is a change in the vehicle velocity V or the steering angle θ occurring during the lane change of the vehicle 12 by hearing the output voice and seeing the displayed image 46. After this, the communication device 10 returns to step S13, and repeatedly performs the processing of steps S13 to S20.

Accordingly, the processing of steps S13 to S20 is performed repeatedly while the vehicle 12 makes the lane change from the fifth location P5. Therefore, an image 46 and a voice that are in accordance with a condition that changes moment to moment can be successively output from the output section 42 during one operation of the lane change. In a case where the lane change is made as well, it is possible that the driver 30 would feel annoyed when the voice is output from the output section 42 many times. Therefore, after the output of the image 46 and the voice has been performed once, by moving to step S16 after there is an affirmative determination process at step S17 (step S17: YES), as shown by the broken line in FIG. 12, it is possible for the voice output to be performed only once.

Then, when the vehicle 12 has reached the sixth location P6 and travels on the other lane 58b as a result of making the lane change, and the driver 30 manipulates the blinker lever 18 to output the OFF signal Soff from the blinker switch 20 to the blinker 16, the blinker 16 stops blinking. The ECU 28 acquires the OFF signal Soff from the blinker switch 20 via the communication line 32, and the vehicle information acquiring section 36a acquires the OFF signal Soff from the ECU 28 via the communication line 34.

Due to this, at step S13, the dialog decision section 36b determines that the blinker 16 has transitioned from the ON state to the OFF state based on the vehicle information acquiring section 36a having acquired the OFF signal Soff (step S13: NO). As a result, the communication device 10 ends the operation relating to the lane change of the vehicle 12.

In the above description, a case is shown in which the lane change is made from the one lane 58a to the other lane 58b, but the lane change can also be made in accordance with the flow chart of FIG. 12 in a case where the lane change is from the other lane 58b to the one lane 58a.

3. Effect of the Present Embodiment

As described above, the communication device 10 (vehicle communication device) according to the present invention is a device that outputs a voice based on vehicle information to a driver 30 (occupant) of a vehicle 12. The communication device 10 includes a vehicle information acquiring section 36a that acquires, from an ECU 28 of the vehicle 12, at least one piece of vehicle information from among an ON signal Son or an OFF signal Soff of a blinker switch 20 provided to the vehicle 12, a steering angle θ of a steering wheel 24 provided to the vehicle 12, and a current vehicle velocity V of the vehicle 12; a dialog storage section 38 that stores a plurality of lines of dialog; a dialog decision section 36b (dialog selecting section) that selects dialog corresponding to the vehicle information from among the plurality of lines of dialog stored in the dialog storage section 38; and a output section 42 that outputs the selected dialog as a voice to the inside of the vehicle 12.

In a case where the vehicle information acquiring section 36a continues to acquire the ON signal Son, when an absolute value |θ| of a steering angle θ is greater than or equal to 90° (greater than or equal to a prescribed angle) or the absolute value |θ| of the steering angle θ is in a range from 90° to 210° or from θ1 to θ2 (within a prescribed angle range) and when the vehicle velocity V is greater than or equal to a threshold value Vtht or Vthc, the dialog decision section 36b selects A-group dialog (first dialog) corresponding to the ON signal Son, the steering angle θ, and the vehicle velocity V, from among the plurality of lines of dialog. On the other hand, if there is a change in the steering angle θ or the vehicle velocity V, the dialog decision section 36b selects B-group dialog (second dialog), which is different from the A-group dialog, corresponding to the change of the steering angle θ or the vehicle velocity V, from among the plurality of lines of dialog.

Furthermore, the non-transitory computer-readable recording medium storing the program according to the present embodiment is a non-transitory computer-readable recording medium storing a program that causes the communication device 10 to function in a manner to output a voice based on the vehicle information to the driver 30 of the vehicle 12. The communication device 10 includes the vehicle information acquiring section 36a, the dialog storage section 38, the dialog decision section 36b, and the output section 42 described above.

The program causes the dialog decision section 36b to function in a manner to, in a case where the vehicle information acquiring section 36a continues to acquire the ON signal Son, when an absolute value |θ| of a steering angle θ is greater than or equal to 90° or the absolute value |θ| of the steering angle θ is in a range from 90° to 210° or from θ1 to θ2 and when the vehicle velocity V is greater than or equal to a threshold value Vtht or Vthc, select A-group dialog corresponding to the ON signal Son, the steering angle θ, and the vehicle velocity V from among the plurality of lines of dialog, and if there is a change in the steering angle θ or the vehicle velocity V, select B-group dialog, which is different from the A-group dialog, corresponding to the change of the steering angle θ or the vehicle velocity V, from among the plurality of lines of dialog.

Due to this, while the vehicle 12 is traveling, the B-group dialog is output as the voice when there is a change in the situation, such as in a case where there is a pedestrian ahead, there is an obstacle ahead, an irregular intersection 52 (e.g., an intersection 52 having an irregular curve) is being traveled through, or a case where there is a change in the manipulation for the left or right turn or the lane change, after voice output of the A-group dialog. Therefore, the affinity the driver 30 feels for the vehicle 12 is improved by noticing the B-group dialog. Furthermore, it is possible to improve awareness for safe driving and the importance of the vehicle 12.

Furthermore, when there is a change in the steering angle θ of the steering wheel 24 or the vehicle velocity V caused by a habit of the driver 30, it is possible to bring the change in the steering angle θ or the vehicle velocity V to the attention of the driver 30 by outputting the B-group dialog as the voice. Due to this, the driver 30 can be warned to break such a habit, and therefore it is possible to improve skills for safe driving.

In this case, if the steering angle θ or the vehicle velocity V has changed during the output of the A-group dialog by the output section 42, the dialog decision section 36b selects B-group dialog from among the plurality of lines of dialog, and the output section 42 prioritizes the selected B-group dialog over the A-group dialog and outputs the selected B-group dialog as the voice. Therefore, it is possible to more quickly notify the driver 30 that the steering angle θ or the vehicle velocity V has changed due to a manipulation made by the driver 30.

The plurality of lines of dialog are given respective occurrence rates Rga to Rgc indicating a frequency of being output as the voice from the output section 42 for the vehicle information acquired by the vehicle information acquiring section 36a. This makes it possible for lines of dialog with low occurrence rates Rga to Rgc to be output as rare voice sounds, so that the driver 30 does not get bored.

The communication device 10 further includes an image storage section 40 that stores a plurality of images 46 corresponding to the plurality of lines of dialog. In this case, the dialog decision section 36b selects dialog corresponding to the vehicle information from among the plurality of lines of dialog stored in the dialog storage section 38, and selects an image 46 corresponding to the vehicle information from among the plurality of images 46 stored in the image storage section 40. The output section 42 outputs the selected dialog as a voice to the inside of the vehicle 12, and displays the selected image 46 in the screen 42b. Due to this, the driver 30 can recognize as if a character 44 in the image 46 displayed in the screen 42b were speaking. As a result, the affinity that the driver 30 feels for the image 46 and the vehicle 12 can be further increased.

Specifically, the dialog storage section 38 includes an A-group storage region 38a (first storage region) that stores a plurality of lines of A-group dialog (first dialog group), a B-group storage region 38b (second storage region) that stores a plurality of lines of B-group dialog (second dialog group), and a C-group storage region 38c (third storage region) that stores a plurality of lines of C-group dialog (third dialog, third dialog group) corresponding to an ON signal Son. When the vehicle information acquiring section 36a acquires the ON signal Son for the first time, the dialog decision section 36b selects the dialog corresponding to the ON signal Son, from among the C-group dialog of the C-group storage region 38c, and the output section 42 outputs the selected dialog as the voice.

Here, in a case where the vehicle information acquiring section 36a continues to acquire the ON signal Son, when an absolute value |θ| of a steering angle θ is within a prescribed angle range (90° to 210° or θ1 to θ2) and when the vehicle velocity V is greater than or equal to a threshold value Vtht or Vthc, the dialog decision section 36b selects the dialog corresponding to the ON signal Son, the steering angle θ, and the vehicle velocity V, from among the A-group dialog of the A-group storage region 38a, and the output section 42 outputs the selected dialog as the voice.

If the steering angle θ or the vehicle velocity V has changed during the voice output of the A-group dialog from the output section 42, the dialog decision section 36b selects dialog corresponding to the ON signal Son and the steering angle θ or the vehicle velocity V, from among the B-group dialog of the B-group storage region 38b, and the output section 42 outputs the selected B-group dialog, instead of the A-group dialog, as the voice.

Therefore, it is possible to output an appropriate voice from the output section 42 according to the situation of the vehicle 12 that changes moment to moment. As a result, the affinity of the driver 30 to the vehicle 12 and awareness of safe driving can be further enhanced.

When the absolute value |θ| of the steering angle θ is less than 90° or θ1 (prescribed angle) or the absolute value |θ| of the steering angle θ is outside a range from 90° to 210° or from θ1 to θ2 (a prescribed angle range), the output of the voice from the output section 42 may be stopped or the dialog decision section 36b may select dialog differing from the A-group dialog and the B-group dialog, from among the plurality of lines of dialog and the output section 42 may output the selected dialog as the voice. Therefore, it is possible to output the voice and stop the output of the voice at appropriate timings.

The A-group dialog is dialog for notifying the driver 30 of a left or right turn or a lane change of the vehicle 12 that is based on a manipulation of the steering wheel 24 and the blinker lever 18 (blinker switch 20) by the driver 30. On the other hand, the B-group dialog is dialog for bringing a change of the steering angle θ or of the vehicle velocity V to the attention of the driver 30. Therefore, it is possible to output suitable dialog corresponding to the situation of the vehicle 12 as the voice, and for the driver 30 to recognize the situation of the vehicle 12 indicated by the dialog.

The communication device 10 is a mobile device 14 inside the vehicle 12, and the output section 42 is a speaker 42a and a screen 42b provided to the mobile device 14. Therefore, it is possible to easily output the voice and display the image 46 inside the vehicle 12.

The present invention is not limited to the above-described embodiment, and it goes without saying that various modifications could be adopted therein without departing from the essence and gist of the present invention.

The invention claimed is:

1. A vehicle communication device that outputs a voice based on vehicle information to an occupant of a vehicle, comprising:
   a vehicle information acquiring section configured to acquire, from an ECU of the vehicle, at least one piece of vehicle information from among an ON signal or an OFF signal of a blinker switch provided to the vehicle, a steering angle of a steering wheel provided to the vehicle, and a current vehicle velocity of the vehicle;
   a dialog storage section configured to store a plurality of lines of dialog;
   a dialog selecting section configured to select dialog corresponding to the vehicle information, from among the plurality of lines of dialog stored in the dialog storage section; and
   an output section configured to output the selected dialog as a voice to an inside of the vehicle, wherein:
   the dialog selecting section:
   if the vehicle information acquiring section is continuing to acquire the ON signal, when the steering angle is greater than or equal to a prescribed angle or falls within a prescribed angle range and the vehicle velocity is greater than or equal to a threshold value, selects first dialog corresponding to the ON signal, the steering angle, and the vehicle velocity, from among the plurality of lines of dialog;
   if the steering angle or the vehicle velocity has changed, selects second dialog, which is different from the first dialog, corresponding to change of the steering angle or the vehicle velocity, from among the plurality of lines of dialog,
   if the steering angle or the vehicle velocity has changed during voice output of the first dialog by the output section, the dialog selecting section selects the second dialog from among the plurality of lines of dialog; and
   the output section prioritizes the selected second dialog over the first dialog and outputs the selected second dialog as the voice.

2. The vehicle communication device according to claim 1, wherein:
   the plurality of lines of dialog are given respective occurrence rates indicating a frequency of being output as the voice from the output section, for the vehicle information acquired by the vehicle information acquiring section.

3. The vehicle communication device according to claim 1, further comprising:
   an image storage section configured to store a plurality of images corresponding to the plurality of lines of dialog, wherein:
   the dialog selecting section selects dialog corresponding to the vehicle information from among the plurality of lines of dialog stored in the dialog storage section, and selects an image corresponding to the vehicle information from among the plurality of images stored in the image storage section; and
   the output section outputs the selected dialog as the voice to the inside of the vehicle, and displays the selected image in a screen.

4. The vehicle communication device according to claim 1, wherein:
   the dialog storage section includes a first storage region configured to store a plurality of lines of the first dialog as a first dialog group, a second storage region configured to store a plurality of lines of the second dialog as a second dialog group, and a third storage region configured to store a plurality of lines of third dialog corresponding to the ON signal, as a third dialog group;
   when the vehicle information acquiring section acquires the ON signal for a first time, the dialog selecting section selects third dialog corresponding to the ON signal from among the third dialog group of the third storage region, and the output section outputs the selected third dialog as the voice;
   when the vehicle information acquiring section continues acquiring the ON signal, if the steering angle is greater than or equal to the prescribed angle or falls within the prescribed angle range and the vehicle velocity is greater than or equal to the threshold value, the dialog selecting section selects first dialog corresponding to the ON signal, the steering angle, and the vehicle velocity, from among the first dialog group of the first storage region, and the output section outputs the selected first dialog as the voice; and
   if the steering angle or the vehicle velocity has changed during voice output of the first dialog from the output section, the dialog selecting section selects second dialog corresponding to the ON signal and the steering angle or the vehicle velocity, from among the second dialog group of the second storage section, and the output section outputs the selected second dialog, instead of the first dialog, as the voice.

5. The vehicle communication device according to claim 1, wherein:
   if the steering angle is less than the prescribed angle or the steering angle is outside the prescribed angle range, output of the voice from the output section is stopped or the dialog selecting section selects dialog that is different from the first dialog and the second dialog, from among the plurality of lines of dialog, and the output section outputs the selected dialog as the voice.

6. The vehicle communication device according to claim 1, wherein:
   the first dialog is dialog for notifying the occupant of a right or left turn or a lane change of the vehicle that is based on a manipulation of the steering wheel and the blinker switch by the occupant; and
   the second dialog is dialog for making the occupant notice that the steering angle or the vehicle velocity is changing.

7. The vehicle communication device according to claim 1, wherein:
   the vehicle communication device is a mobile device inside the vehicle; and
   the output section is a speaker and a screen provided to the mobile device.

8. A non-transitory computer-readable recording medium storing a program that causes a vehicle communication device to function in a manner to output a voice based on vehicle information to an occupant of a vehicle, wherein:
the vehicle communication device comprises:
- a vehicle information acquiring section configured to acquire, from an ECU of the vehicle, at least one piece of vehicle information from among an ON signal or an OFF signal of a blinker switch provided to the vehicle, a steering angle of a steering wheel provided to the vehicle, and a current vehicle velocity of the vehicle;
- a dialog storage section configured to store a plurality of lines of dialog;
- a dialog selecting section configured to select dialog corresponding to the vehicle information, from among the plurality of lines of dialog stored in the dialog storage section; and
- an output section configured to output the selected dialog as a voice to an inside of the vehicle, wherein:

the program causes the dialog selecting section to perform a process comprising:
if the vehicle information acquiring section is continuing to acquire the ON signal, when the steering angle is greater than or equal to a prescribed angle or falls within a prescribed angle range and the vehicle velocity is greater than or equal to a threshold value, selecting first dialog corresponding to the ON signal, the steering angle, and the vehicle velocity, from among the plurality of lines of dialog;
if the steering angle or the vehicle velocity has changed, selecting second dialog, which is different from the first dialog, corresponding to change of the steering angle or the vehicle velocity, from among the plurality of lines of dialog,
if the steering angle or the vehicle velocity has changed during voice output of the first dialog by the output section, the dialog selecting section selects the second dialog from among the plurality of lines of dialog; and
the output section prioritizes the selected second dialog over the first dialog and outputs the selected second dialog as the voice.

9. A vehicle communication device that outputs a voice based on vehicle information to an occupant of a vehicle, comprising:
- a vehicle information acquiring section configured to acquire, from an ECU of the vehicle, at least one piece of vehicle information from among an ON signal or an OFF signal of a blinker switch provided to the vehicle, a steering angle of a steering wheel provided to the vehicle, and a current vehicle velocity of the vehicle;
- a dialog storage section configured to store a plurality of lines of dialog;
- a dialog selecting section configured to select dialog corresponding to the vehicle information, from among the plurality of lines of dialog stored in the dialog storage section; and
- an output section configured to output the selected dialog as a voice to an inside of the vehicle, wherein:

the dialog selecting section:
if the vehicle information acquiring section is continuing to acquire the ON signal, when the steering angle is greater than or equal to a prescribed angle or falls within a prescribed angle range and the vehicle velocity is greater than or equal to a threshold value, selects first dialog corresponding to the ON signal, the steering angle, and the vehicle velocity, from among the plurality of lines of dialog;
if the steering angle or the vehicle velocity has changed, selects second dialog, which is different from the first dialog, corresponding to change of the steering angle or the vehicle velocity, from among the plurality of lines of dialog;
the dialog storage section includes a first storage region configured to store a plurality of lines of the first dialog as a first dialog group, a second storage region configured to store a plurality of lines of the second dialog as a second dialog group, and a third storage region configured to store a plurality of lines of third dialog corresponding to the ON signal, as a third dialog group;
when the vehicle information acquiring section acquires the ON signal for a first time, the dialog selecting section selects third dialog corresponding to the ON signal from among the third dialog group of the third storage region, and the output section outputs the selected third dialog as the voice;
when the vehicle information acquiring section continues acquiring the ON signal, if the steering angle is greater than or equal to the prescribed angle or falls within the prescribed angle range and the vehicle velocity is greater than or equal to the threshold value, the dialog selecting section selects first dialog corresponding to the ON signal, the steering angle, and the vehicle velocity, from among the first dialog group of the first storage region, and the output section outputs the selected first dialog as the voice; and
if the steering angle or the vehicle velocity has changed during voice output of the first dialog from the output section, the dialog selecting section selects second dialog corresponding to the ON signal and the steering angle or the vehicle velocity, from among the second dialog group of the second storage section, and the output section outputs the selected second dialog, instead of the first dialog, as the voice.

10. A non-transitory computer-readable recording medium storing a program that causes a vehicle communication device to function in a manner to output a voice based on vehicle information to an occupant of a vehicle, wherein:
the vehicle communication device comprises:
- a vehicle information acquiring section configured to acquire, from an ECU of the vehicle, at least one piece of vehicle information from among an ON signal or an OFF signal of a blinker switch provided to the vehicle, a steering angle of a steering wheel provided to the vehicle, and a current vehicle velocity of the vehicle;
- a dialog storage section configured to store a plurality of lines of dialog;
- a dialog selecting section configured to select dialog corresponding to the vehicle information, from among the plurality of lines of dialog stored in the dialog storage section; and
- an output section configured to output the selected dialog as a voice to an inside of the vehicle, wherein:

the program causes the dialog selecting section to perform a process comprising:
if the vehicle information acquiring section is continuing to acquire the ON signal, when the steering angle is greater than or equal to a prescribed angle or falls within a prescribed angle range and the vehicle velocity is greater than or equal to a threshold value, selecting first dialog corresponding to the ON signal, the steering angle, and the vehicle velocity, from among the plurality of lines of dialog;
if the steering angle or the vehicle velocity has changed, selecting second dialog, which is different from the first dialog, corresponding to change of the steering angle or the vehicle velocity, from among the plurality of lines of dialog;

the dialog storage section includes a first storage region configured to store a plurality of lines of the first dialog as a first dialog group, a second storage region configured to store a plurality of lines of the second dialog as a second dialog group, and a third storage region configured to store a plurality of lines of third dialog corresponding to the ON signal, as a third dialog group;

when the vehicle information acquiring section acquires the ON signal for a first time, the dialog selecting section selects third dialog corresponding to the ON signal from among the third dialog group of the third storage region, and the output section outputs the selected third dialog as the voice;

when the vehicle information acquiring section continues acquiring the ON signal, if the steering angle is greater than or equal to the prescribed angle or falls within the prescribed angle range and the vehicle velocity is greater than or equal to the threshold value, the dialog selecting section selects first dialog corresponding to the ON signal, the steering angle, and the vehicle velocity, from among the first dialog group of the first storage region, and the output section outputs the selected first dialog as the voice; and if the steering angle or the vehicle velocity has changed during voice output of the first dialog from the output section, the dialog selecting section selects second dialog corresponding to the ON signal and the steering angle or the vehicle velocity, from among the second dialog group of the second storage section, and the output section outputs the selected second dialog, instead of the first dialog, as the voice.

\* \* \* \* \*